July 27, 1965  A. S. WATSON ETAL  3,197,028
APPARATUS FOR SEPARATION OF ORES
Filed Dec. 28, 1961  3 Sheets-Sheet 1

INVENTORS
ALEXANDER S. WATSON
FREDERICK B. WATSON
BY
PATENT AGENT

July 27, 1965   A. S. WATSON ETAL   3,197,028
APPARATUS FOR SEPARATION OF ORES
Filed Dec. 28, 1961   3 Sheets-Sheet 2

INVENTORS
ALEXANDER S. WATSON
FREDERICK B. WATSON

BY

PATENT AGENT

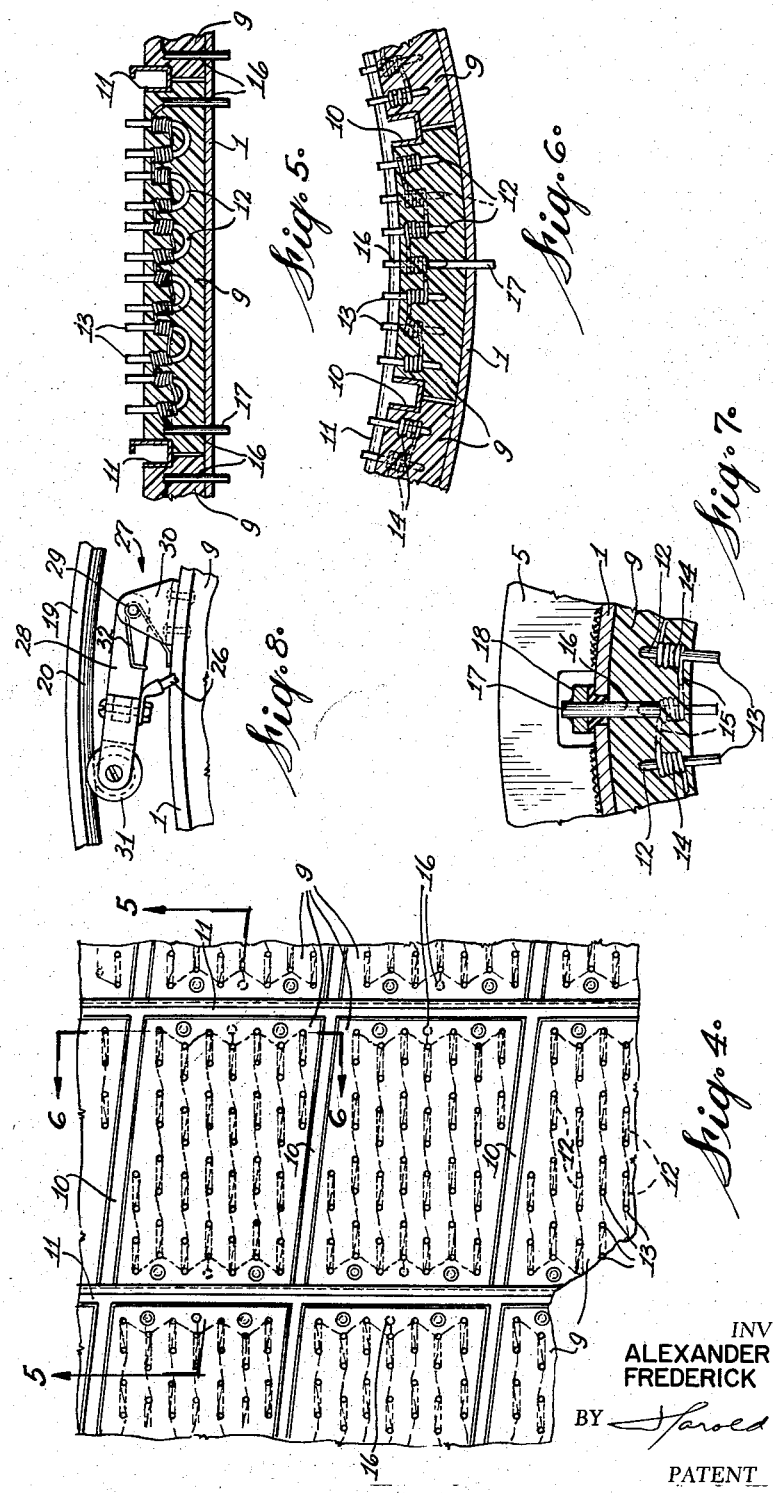

United States Patent Office 3,197,028
Patented July 27, 1965

3,197,028
APPARATUS FOR SEPARATION OF ORES
Alexander S. Watson, P.O. Box 34, and Frederick B. Watson, both of Dunham, Quebec, Canada; said Frederick B. Watson assignor to Alexander S. Watson, Maniwaki, Quebec, Canada
Filed Dec. 28, 1961, Ser. No. 162,691
1 Claim. (Cl. 209—221)

This invention relates to an apparatus for ore separation and more particularly for separation of titaniferous and manganiferous iron ores or other slightly or non-magnetic substances from natural or artificial magnetites or other strongly magnetic ores.

Magnetic ore separators have long been employed. However, in many instances, separation by magnetic means is not feasible because of (a) lack of sharply defined separation and (b) lack of capacity to deal with large quantities of ore within practical time limits.

One instance of an existing situation wherein no practical separation procedure has been developed is that in respect of manganiferous iron ores. It is well-recognized that such ores are not suitable for use in the production of iron unless their content of manganese is not substantially more than 0.5%. On the other hand, millions of tons of manganiferous iron ores containing, say 9% or more manganese exist in various areas with little attempt made to make use of them because no practical separation procedure is available.

It is an object of this invention to provide an apparatus for treating ores to separate the non-magnetic components from the magnetic components therein in a rapid, accurate and relatively inexpensive manner.

In accordance with the invention, the ore to be treated is ground to minus 200 mesh or finer, and preferably minus 325 mesh or finer. The finely ground ore is placed on a moving surface having a plurality of magnetized projections and simultaneously subjected to a plurality of water sprays to wash away the slightly or non-magnetic material while permitting the magnetic material therein to adhere to the magnetic projections. The surface with the magnetic material adhering to the projections is then moved to an elevated position wherein the projections are demagnetized and the magnetic material allowed to drop therefrom. Water sprays may be employed to assist separation of the magnetic material from the demagnetized projections.

Figures 1, 2:
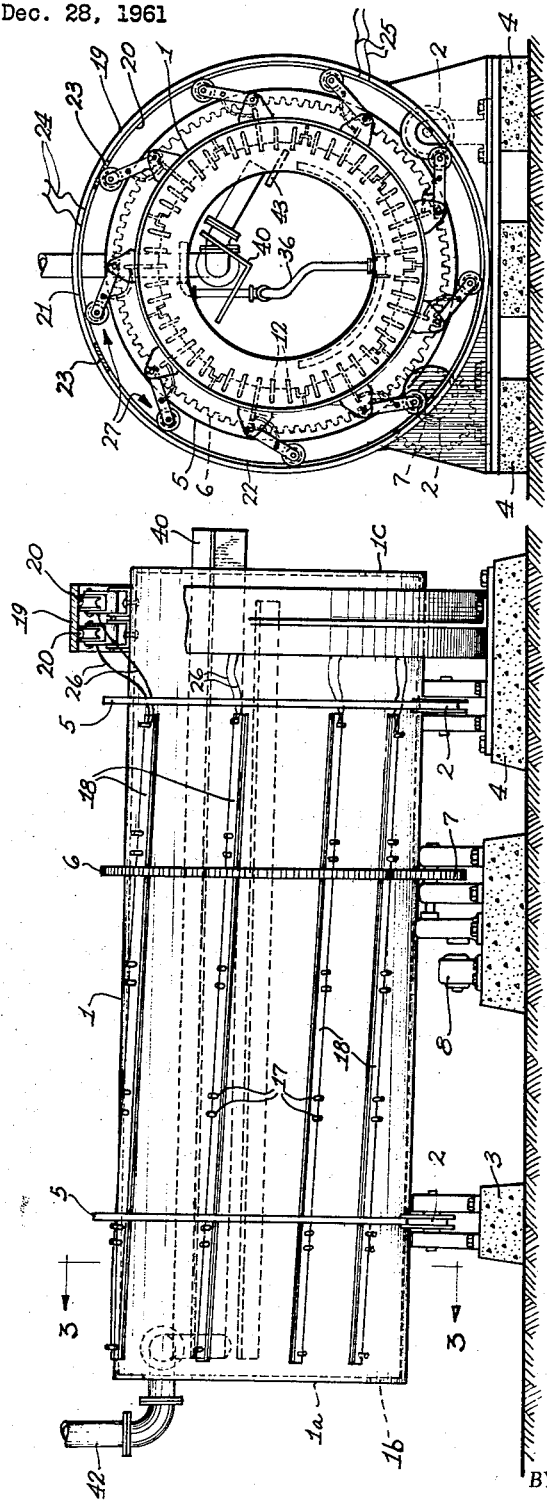
Figure 3:
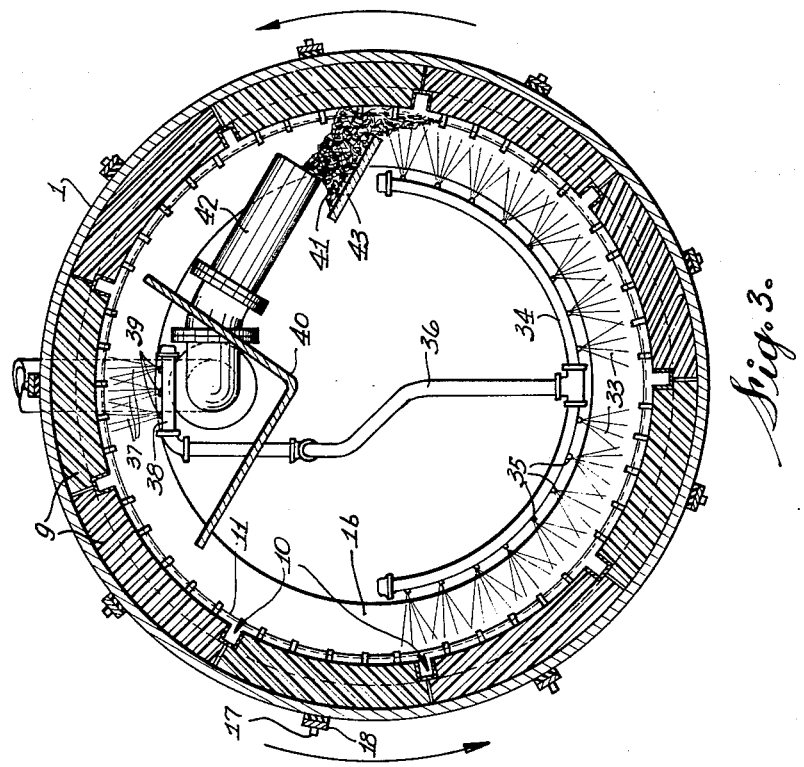

The invention will be described with reference to be accompanying drawings, in which:

FIGURE 1 is a side elevation of an apparatus in accordance with the invention,
FIGURE 2 is an end elevation of the apparatus,
FIGURE 3 is an enlarged sectional end elevation on line 3—3 of FIGURE 1,
FIGURE 4 is a partial plan view of the interior of the drum constituting a portion of the apparatus,
FIGURE 5 is a section on line 5—5 of FIGURE 4,
FIGURE 6 is a section on line 6—6 of FIGURE 4,
FIGURE 7 is a partial end elevation of the drum showing a connecting means for the projections, and
FIGURE 8 is an end elevation of an electrical connection means.

Referring to the drawings, 1 is an open-ended generally cylindrical drum or shell which may be formed of a suitable metal such as aluminum. The drum is disposed about an axis which is preferably arranged at a slight angle, say 5 to 15°, from the horizontal. The drum has an open upper feed end 1a, which is provided with an internally directed flange 1b, and an open lower discharge end 1c. The drum is rotatably mounted on rollers 2 carried by bases 3 and 4 by means of circular rails 5 fixed to the drum. The drum is rotatively driven by means of a circular gear 6 on the drum, and a sprocket 7 driven by any suitable means such as a motor 8.

Mounted on the interior surface of the drum are a plurality of blocks 9 of plastic composition or the like. The blocks 9 are of quadrilateral outline and are curved to fit the curvature of the drum. Between each pair of adjacent longitudinal edges of the blocks is mounted an open trough 10, and between each pair of adjacent lateral edges of the blocks is mounted an open trough 11, all of the troughs 10 and 11 being in intercommunicating relation to each other. It will be observed that the troughs 10 extend longitudinally of the drum and the troughs 11 extend circumferentially of the drum. As shown in FIGURE 4, the troughs 10 are inclined downwardly with respect to the axis of the drum.

Embedded in each block 9 are a multiplicity of horse-shoe electromagnets 12 having poles or projections 13 projecting radially inwardly of the block and drum. The magnets 12 are arranged in a series of longitudinally aligned rows in each block (see FIGURE 4), the projections 13 of each row being laterally staggered with respect to the projections of adjacent rows. Thus, each projection 13 is disposed laterally opposite approximately the midpoints between projections of adjacent rows.

Each magnet 12 has each of its poles provided with a winding 14 of electrically conducting wire and all of such windings are connected, as indicated at 15 to one of a plurality of posts 16 also embedded in a block 9 and having a portion 17 projecting radially outwardly of the drum (FIGURE 7).

The post portions 17 are arranged in longitudinally aligned rows and each row is electrically connected to a conducting strip 18 mounted on the external surface of the drum (FIGURES 4 and 7).

Means for energizing and de-energizing the strips 18 and thus the electromagnets 12 comprises an annular frame 19 fixed to base 4 and surrounding one end portion of the drum. Frame 19 has two rings 20 mounted on the interior surface thereof and formed of any suitable electrically conducting material. Each ring comprises an upper section 21 and a lower section 22 separated from each other by intervening minor sections 23 of insulating material. In the modification shown, the upper sections 21 are of considerably less length than that of the lower sections. The upper sections of the ring are connected to a source of alternating current as by wires indicated at 24 and the lower sections of the ring are connected to a source of direct current as by wires indicated at 25.

Each strip 18 is electrically connected by wires 26 to a pair of electrical take-off or connecting devices 27. Each device 27 comprises an arm 28 pivoted at 29 to a bracket 30 fixed to the drum and carrying a peripherally grooved roller 31 held in engagement with a ring 20 by means of a spring 32. It will be apparent that the rollers 31 will traverse the rings 20 on revolution of the drum.

The interior surface of the lower travelling section of the drum (substantially the entire lower hemicylindrical portion thereof as shown in FIGURE 3) is subjected to a plurality of water sprays 33 as provided by an arcuate tube 34 having nozzles 35 directed onto such interior surface and adapted to be supplied with water under pressure by means of a pipe 36. A minor topmost portion of the upper travelling section of the drum is subjected to a plurality of water sprays 37 as provided by a tube 38 having nozzles 39 directed onto the interior topmost surface portion of the drum. The tube 38 is also supplied with water under pressure as from the pipe 36.

Located directly below the sprays 37 and the topmost portion of the drum is a concentrate-receiving trough 40.

The ore 41 to be treated is fed to the interior of the drum as by means of a chute 42 located at the upper or feed end of the drum. As shown in FIGURE 3, the feed stream is directed into the lower travelling half of the drum and a baffle 43 directs such feed stream onto the interior surface of the drum.

In operation and as previously indicated, the ore to be treated is finely ground to minus 200 mesh and preferably minus 325 mesh or finer.

The finely ground ore is fed into the drum which is driven in the manner described. The particles thus flow over the interior surface of the drum in contact with the projections 13. Since the lower sections of the rings 20 are subjected to a source of direct current, the electromagnets 12 on the lower travelling major portion of the drum are energized and therefore they act to magnetize the iron particles in the ore. As the iron particles become magnetized, they cling to the projections 13. The water sprays 33 greatly facilitate this action since they tend to free the iron particles for contact with the projections 13 while removing intervening non or slightly magnetic particles which are carried away with the resulting water stream and are discharged therewith from the lower or discharge end of the drum.

The separating action of the water sprays 33 with the resultant freeing of the magnetic particles for ease of contact with the projections 13 is greatly facilitated by the provision of the troughs 10 and 11 which serve to quickly remove the non-magnetic particles from the exposed surface areas of the blocks 9. The inclined troughs 11 guide the streams therein towards the bottom of the drum.

As the take-off devices 27 pass over the first insulating section 23, the magnets become de-energized and the clinging iron ore particles tend to drop off the projections 13 into the trough 40. Moreover, as the takeoff devices 27 traverse the upper ring sections 21, the alternating current will cause the magnets to reverse their polarity rapidly which will cause the magnets to repel any material still clinging to the projections. The sprays 37 assist in removing any remaining particles still clinging to the projections.

After traversing the relatively short A.C. sections 21, the devices 27 pass over the second insulating section 23 and then again contact the lower D.C. ring sections 22 to complete the cycle.

It will be understood that the expression "non-magnetic material" as used in the appended claim is intended to include material of very slightly magnetic character as compared with strongly magnetic materials.

We claim:

An apparatus for separating non-magnetic material from magnetic material in ores containing said materials which comprises an inclined open-ended revolvably mounted drum, said drum having an interior liner comprising a plurality of blocks of plastic composition, a plurality of rows of longitudinally aligned horseshoe electromagnets embedded in each said block, each said magnet having projections extending radially inwardly of said block and drum, means for energizing and de-energizing said magnets comprising an annular frame surrounding said drum adjacent one end thereof, a pair of rings of electrically conducting material mounted to the interior surface of said annular frame, each said ring having an upper section, a lower section, and minor sections of insulating material separating said upper and lower sections, means connecting said upper sections to a source of alternating current, means connecting said lower sections to a source of direct current, a plurality of electrically conducting members carried by said drum and engaging each of said rings, and means electrically connecting said magnets and said electrically conducting members, said drum having an upper section disposed above its longitudinal axis and a lower section disposed below its longitudinal axis, a water sprayer mounted within said drum having a plurality of nozzles directed upon said magnet projections in said lower section, a material receiving trough for receipt of the supported magnetic material mounted within said upper section and extending longitudinally thereof, and a water sprayer mounted within said drum and having a plurality of nozzles directed upon said magnet projections in said upper section above said trough, each said block being of quadrilateral outline, said blocks being arranged in longitudinally aligned rows, a plurality of longitudinally extending troughs each arranged between adjacent longitudinal edges of said blocks, and a plurality of circumferentially extending troughs each arranged between adjacent lateral edges of said blocks, all of said circumferentially extending troughs being in communication with said longitudinally extending troughs.

References Cited by the Examiner

UNITED STATES PATENTS

| Re. 9,229 | 6/80 | Fritz | 209—221 |
| 1,026,673 | 5/12 | Heinen | 209—221 |
| 1,374,472 | 4/21 | Richardson | 209—452 |

FOREIGN PATENTS

| 968,797 | 3/58 | Germany. |
| 17,486 | 9/91 | Great Britain. |
| 566,636 | 1/45 | Great Britain. |
| 777,011 | 6/57 | Great Britain. |

HARRY B. THORNTON, *Primary Examiner.*

GEORGE D. MITCHELL, HERBERT L. MARTIN, ROBERT A. O'LEARY, *Examiners.*